US012266089B2

(12) United States Patent
Yang et al.

(10) Patent No.: US 12,266,089 B2
(45) Date of Patent: Apr. 1, 2025

(54) APPARATUS AND METHOD FOR PERFORMING ARTIFICIAL INTELLIGENCE ENCODING AND ARTIFICIAL INTELLIGENCE DECODING OF IMAGE

(71) Applicant: SAMSUNG ELECTRONICS CO., LTD., Suwon-si (KR)

(72) Inventors: Heechul Yang, Suwon-si (KR); Inhak Na, Suwon-si (KR); Hyunkwon Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 567 days.

(21) Appl. No.: 17/566,283

(22) Filed: Dec. 30, 2021

(65) Prior Publication Data

US 2022/0172340 A1 Jun. 2, 2022

Related U.S. Application Data

(63) Continuation of application No. PCT/KR2021/017904, filed on Nov. 30, 2021.

(30) Foreign Application Priority Data

Nov. 30, 2020 (KR) ........................ 10-2020-0165072

(51) Int. Cl.
*G06T 7/00* (2017.01)
*G06N 3/045* (2023.01)
(Continued)

(52) U.S. Cl.
CPC ........... *G06T 7/0002* (2013.01); *G06N 3/045* (2023.01); *G06N 3/08* (2013.01); *G06T 5/40* (2013.01);
(Continued)

(58) Field of Classification Search
CPC .......... G06T 7/0002; G06T 5/40; G06T 5/50; G06T 2207/20081; G06T 2207/20084;
(Continued)

(56) References Cited

U.S. PATENT DOCUMENTS 11,082,610 B2 8/2021 Shin et al.
11,200,702 B2 12/2021 Dinh et al.
(Continued)

FOREIGN PATENT DOCUMENTS

CN 110503097 A 11/2019
JP 2014-130427 A 7/2014
(Continued)

OTHER PUBLICATIONS

Communication dated Nov. 23, 2023, issued by the European Patent Office in counterpart European Application No. 21898752.7.
(Continued)

*Primary Examiner* — Van D Huynh
(74) *Attorney, Agent, or Firm* — Sughrue Mion, PLLC

(57) ABSTRACT

A method, performed by a terminal, of performing artificial intelligence (AI) decoding, including obtaining, based on a first image, image feature information of the first image, the image feature information being related to an image quality degradation; obtaining, based on the image feature information of the first image, neural network (NN) setting information of a first NN, from among NN setting information of a plurality of first NNs which are pre-stored and which correspond to a plurality of image quality degradation types; and obtaining, by using the first NN, a second image in which the image quality degradation is reduced.

16 Claims, 9 Drawing Sheets

(51) Int. Cl.
  *G06N 3/08* (2023.01)
  *G06T 5/40* (2006.01)
  *G06T 5/50* (2006.01)

(52) U.S. Cl.
  CPC ...... *G06T 5/50* (2013.01); *G06T 2207/20081* (2013.01); *G06T 2207/20084* (2013.01); *G06T 2207/30168* (2013.01)

(58) Field of Classification Search
  CPC . G06T 2207/30168; G06T 9/00; G06T 9/002; G06N 3/045; G06N 3/08; G06N 3/04; H04N 19/147; H04N 19/20; H04N 19/70
  See application file for complete search history.

(56) References Cited

U.S. PATENT DOCUMENTS

| | | | | |
|---|---|---|---|---|
| 2016/0379352 | A1* | 12/2016 | Zhang | G06N 3/08 382/157 |
| 2018/0144447 | A1* | 5/2018 | Tate | G06T 5/60 |
| 2020/0177470 | A1 | 6/2020 | Kuo et al. | |
| 2021/0112261 | A1* | 4/2021 | Hwang | G06T 7/90 |
| 2021/0166073 | A1* | 6/2021 | Gou | G06T 11/00 |
| 2021/0166343 | A1* | 6/2021 | Kim | G06N 3/045 |
| 2021/0233283 | A1* | 7/2021 | Tanabe | G06T 3/4046 |
| 2021/0287338 | A1* | 9/2021 | Shih | G06T 7/0002 |
| 2021/0390673 | A1* | 12/2021 | Ban | G06T 5/20 |
| 2022/0101493 | A1* | 3/2022 | Kimura | G06T 3/4046 |
| 2022/0198610 | A1* | 6/2022 | Kulikov | G06N 3/08 |
| 2023/0007282 | A1* | 1/2023 | Hu | H04N 19/33 |

FOREIGN PATENT DOCUMENTS

| | | |
|---|---|---|
| KR | 10-1922964 B1 | 11/2018 |
| KR | 10-2019-0042429 A | 4/2019 |
| KR | 10-2019-0106945 A | 9/2019 |
| KR | 10-2020-0044653 A | 4/2020 |
| KR | 10-2020-0044662 A | 4/2020 |
| KR | 10-2020-0095589 A | 8/2020 |
| KR | 10-2020-0101493 A | 8/2020 |
| WO | 2020/085694 A1 | 4/2020 |

OTHER PUBLICATIONS

International Search Report (PCT/ISA/237, PCT/ISA/220 and PCT/ISA/210) dated Mar. 3, 2022 issued by the International Searching Authority in International Application No. PCT/KR2021/017904.
Communication issued on Oct. 21, 2024 from the Korean Intellectual Property Office for Korean Patent Application No. 10-2020-0165072.

* cited by examiner

APPARATUS AND METHOD FOR PERFORMING ARTIFICIAL INTELLIGENCE ENCODING AND ARTIFICIAL INTELLIGENCE DECODING OF IMAGE

CROSS-REFERENCE TO RELATED APPLICATIONS

This application is a bypass continuation of International Application No. PCT/KR2021/017904, filed on Nov. 30, 2021, which is based on and claims priority to Korean Patent Application No. 10-2020-0165072, filed on Nov. 30, 2020, in the Korean Intellectual Property Office, the disclosures of which are incorporated by reference herein in their entireties.

TECHNICAL FIELD

The disclosure relates to the field of encoding and decoding of an image. More specifically, the disclosure relates to a device and a method for encoding/decoding an image based on artificial intelligence.

BACKGROUND ART

Images may be encoded by using a codec according to a certain data compression standard, for example, the Moving Picture Experts Group (MPEG) standard, and encoded images may then be stored in a recording medium or transmitted via a communication channel in the form of bit streams.

Various types of degradations in image quality may occur in a process of repeated downloading/uploading and capturing/storing of the same image between a server and a terminal through a social networking service (SNS) and the Internet, and accordingly, the need to effectively reduce such image quality degradations has increased.

DESCRIPTION OF EMBODIMENTS

Technical Problem

A device and a method for artificial intelligence (AI) decoding of an image according to an embodiment of the disclosure decode an image based on AI in order to effectively reduce various types of image quality degradations.

Solution to Problem

In accordance with an aspect of the disclosure, a method, performed by a terminal, of performing artificial intelligence (AI) decoding includes obtaining, based on a first image, image feature information of the first image, the image feature information being related to an image quality degradation; obtaining, based on the image feature information of the first image, neural network (NN) setting information of a first NN, from among NN setting information of a plurality of first NNs which are pre-stored and which correspond to a plurality of image quality degradation types; and obtaining, by using the first NN, a second image in which the image quality degradation is reduced.

The image feature information may be obtained by inputting the first image to a second NN.

The obtaining of the NN setting information of the first NN may include transmitting the image feature information of the first image to a server; and receiving, from the server, based on the image feature information of the first image, the NN setting information of the first NN from among the NN setting information of the plurality of first NNs which are pre-stored in the server.

A first image data set may be obtained through image crawling, a second image data set including a plurality of training images, which include a same object and which have different image quality degradation elements, may be obtained from the first image data set, one training image of the plurality of training images included in the second image data set may be identified as a label image, at least one training image corresponding to a preset image quality degradation type may be identified among the plurality of training images other than the label image, and the label image and the at least one training image corresponding to the preset image quality degradation type may be included in a training image data set, and one first NN from among the plurality of first NNs for processing an image corresponding to the preset image quality degradation type may be trained by using the training image data set.

The obtaining of the NN setting information of the first NN may include obtaining, based on the image feature information of the first image, a value indicating a degree of a preset image quality degradation type present in the first image; based on the value being greater than a first threshold, determining to perform image processing corresponding to the preset image quality degradation type by using the first NN; and based on the value indicating the degree of the preset image quality degradation type being less than the first threshold, determining not to perform the image processing corresponding to the preset image quality degradation type by using the first NN.

The obtaining of the image feature information of the first image, the obtaining of the NN setting information of the first NN, and the obtaining of the second image in which the image quality degradation is reduced may be repeatedly performed with regard to the plurality of image quality degradation types.

The obtaining of the NN setting information of the first NN may include transmitting the image feature information of the first image to a server; receiving, from the server, flag information indicating whether to perform AI image processing, the flag information being determined based on the image feature information of the first image; and obtaining the NN setting information of the first NN based on the flag information.

A first image data set may be obtained through image crawling, a second image data set including a plurality of training images, which include a same object and have different image quality degradation elements, may be obtained from the first image data set, one training image of the plurality of training images included in the second image data set may be identified as a label image, at least one training image corresponding to a preset image quality degradation type may be identified among the plurality of training images other than the label image, the label image and the at least one training image corresponding to the preset image quality degradation type may be identified as a training image data set, and the second NN for identifying the preset image quality degradation type may be trained by using the training image data set.

The image quality degradation may include at least one of resolution-related image quality degradations, color-related image quality degradations, brightness-related image quality degradations, or encoding-related image quality degradations.

The obtaining of the NN setting information of the first NN may include obtaining, based on the image feature information of the first image, values indicating degrees of the plurality of image quality degradation types of the first image; identifying an image quality degradation type having a highest value among the values; and obtaining the NN setting information of the first NN corresponding to the image quality degradation type among the NN setting information of the plurality of first NNs.

The second image data set may be obtained from the first image data set, feature points of images included in the first image data set may be identified, and the plurality of training images may be identified based on the identified feature points.

The image feature information may be obtained based on at least one of a color histogram of the first image, edges and blocking artifacts detected in the first image, a bit rate of the first image, or a resolution of the first image.

In accordance with an aspect of the disclosure, a terminal for artificial intelligence (AI) decoding includes at least one processor configured to execute one or more instructions to: obtain, based on a first image, image feature information of the first image, the image feature information being related to an image quality degradation, obtain, based on the image feature information of the first image, neural network (NN) setting information of a first NN, from among NN setting information of a plurality of first NNs which are pre-stored and which correspond to a plurality of image quality degradation types, and obtain, by using the first NN, which is set based on the NN setting information of the first NN, a second image in which the image quality degradation is reduced.

The image feature information may be obtained by inputting the first image to a second neural network.

In accordance with an aspect of the disclosure, a computer-readable recording medium having recorded thereon instructions which, when executed by at least one processor, cause the at least one processor to: obtain, based on a first image, image feature information of the first image, the image feature information being related to an image quality degradation; obtain, based on the image feature information of the first image, neural network (NN) setting information of a first NN, from among NN setting information of a plurality of first NNs which are pre-stored and which correspond to a plurality of image quality degradation types; and obtain, by using the first NN, a second image in which the image quality degradation is reduced.

In accordance with an aspect of the disclosure, a method of performing artificial intelligence (AI) decoding, the method being is performed by at least one processor and includes obtaining image feature information of a first image, the image feature information may be related to an image quality degradation of the first image; selecting, based on the image feature information, a neural network (NN) configuration of a first NN, from among a plurality of pre-stored NN configurations, the plurality of pre-stored NN configurations may correspond to a plurality of first NNs, and the plurality of first NNs may correspond to a plurality of image quality degradation types; and processing the first image using the first NN to obtain a second image in which the image quality degradation is reduced.

The image quality degradation may correspond to a first image quality degradation type from among the plurality of image quality degradation types, and the first NN may correspond to the first image quality degradation type, and the NN configuration of the first NN may be selected from among the plurality of pre-stored NN configurations based on the first image quality degradation type.

The first image quality degradation type may be determined by inputting the first image into a second NN.

Advantageous Effects of Disclosure

A device and a method for artificial intelligence (AI) decoding of an image according to an embodiment of the disclosure may effectively reduce image quality degradation through AI-based image decoding.

However, effects that may be achieved by the device and method for AI decoding of an image according to an embodiment of the disclosure are not limited to the above-mentioned effect, and other effects that are not mentioned may be clearly understood by those of skill in the art from the following description.

BRIEF DESCRIPTION OF DRAWINGS

The above and other aspects, features, and advantages of certain embodiments of the present disclosure will be more apparent from the following description taken in conjunction with the accompanying drawings, in which.

MODE OF DISCLOSURE

Figure 1:
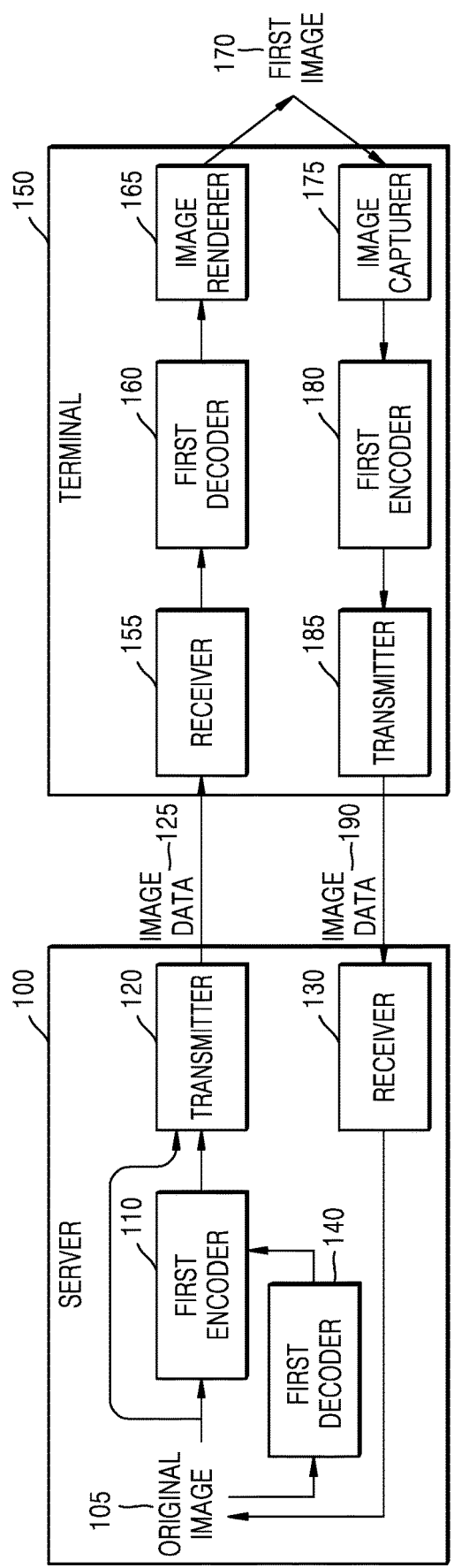
FIG. 1 is a diagram illustrating an example in which an image quality degradation occurs in a process of repeating downloading/uploading and capturing/storing of the same image between a server and a terminal through a social networking service (SNS) and the Internet, according to an embodiment.

Throughout the disclosure, the expression "at least one of a, b or c" indicates only a, only b, only c, both a and b, both a and c, both b and c, all of a, b, and c, or variations thereof.

As the disclosure allows for various changes and numerous examples, embodiments of the disclosure will be illustrated in the drawings and described in detail in the written description. However, this is not intended to limit the disclosure to modes of practice, and it should be understood that all changes, equivalents, and substitutes that do not depart from the spirit and technical scope of the disclosure are encompassed in the disclosure.

In the description of embodiments of the disclosure, detailed explanations of related art are omitted when it is deemed that they may unnecessarily obscure the essence of the disclosure. Also, numbers (for example, a first, a second, and the like) used in the description of the specification are identifiers for distinguishing one element from another, and are not necessarily intended to denote an order.

Also, in the specification, it should be understood that when elements are "connected" or "coupled" to each other, the elements may be directly connected or coupled to each other, or may be indirectly connected or coupled to each other, for example connected or coupled to each other with an intervening element therebetween, unless specified otherwise.

In the specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

As is traditional in the field, embodiments may be described and illustrated in terms of blocks which carry out a described function or functions. These blocks, which may be referred to herein as units or modules or the like, or by names such as driver, controller, processor, encoder, decoder, renderer, capturer, receiver, transmitter, obtainer, identifier, device, engine, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Also, in the specification, an 'image' or a 'picture' may denote a still image, a moving image including a plurality of consecutive still images (or frames), or a video.

Also, in the specification, a deep neural network (DNN) is a representative example of an artificial neural network model simulating brain nerves, and is not limited to an artificial neural network model using a certain algorithm.

Also, in the specification, a 'parameter' is a value used in an operation process of each layer constituting a neural network, and, for example, may include a weight used when an input value is applied to an operation expression. The parameter may be expressed in a matrix form. The parameter is a value determined or obtained as a result of training, and may be updated by using separate training data.

Also, in the specification, a 'first DNN' denotes a DNN used for reducing an image quality degradation corresponding to a preset image quality degradation type, and a 'second DNN' denotes a DNN used for identifying a preset image quality degradation type.

Also, in the specification, 'DNN setting information' denotes information related to an element constituting a DNN, and includes the parameter described above. The first DNN or the second DNN may be configured by using the DNN setting information.

Also, in the specification, a 'first image' denotes an image obtained through first decoding. In addition, the 'second image' denotes an image obtained by artificial intelligence (AI)-decoding (e.g., image processing using the first DNN) the first image.

Also, 'first encoding' denotes encoding by a frequency transformation-based image compression method. Also, 'first decoding' denotes decoding by a frequency transformation-based image reconstruction method.

FIG. 1 is a diagram illustrating an example in which an image quality degradation occurs in a process of repeated downloading/uploading and capturing/storing of the same image between a server 100 and a terminal 150 through a social networking service (SNS) and the Internet.

As illustrated in FIG. 1, when the server 100 having an original image 105 stored therein receives, from the terminal 150, a download request for the image, the server 100 may encode the original image 105 through a first encoder 110 to obtain image data 125, and transmit the image data 125 to the terminal 150 through a transmitter 120. In this case, when performing encoding through the first encoder 110, an image quality degradation may occur due to an encoding error. Such encoding through the first encoder 110 may be performed using one of image compression methods using frequency transformation, such as Moving Picture Experts Group (MPEG)-2, H.264 Advanced Video Coding (AVC), MPEG-4, High Efficiency Video Coding (HEVC), VC-1, VP8, VP9, Joint Photographic Experts Group (JPEG), Alliance for Open Media (AOMedia) Video 1 (AV1), or any other encoding method as desired.

Meanwhile, the original image 105 stored in the server 100 may be an already encoded image, and the image data 125 including the original image 105 may be transmitted to the terminal 150 through the transmitter 120 without encoding through the first encoder 110. Even in this case, because the original image 105 is already encoded, an image quality degradation may occur due to an encoding error. In this case, the encoding error may cause the image quality degradation due to a change in at least one of a bit rate or a resolution of an image. That is, when the encoding method is a lossy compression method, an image quality degradation may occur according to the lossy compression method based on various encoding parameters (e.g., a quantization parameter (QP)).

The terminal 150 may receive the image data 125 through a receiver 155, and decode the image data 125 through a first decoder 160 to obtain a decoded first image. In order to display the decoded first image to the user, the terminal 150 may obtain a first image 170 by rendering, by using an image renderer 165, the decoded first image. In this case, the first image 170 may be an image in which the brightness and color are changed from those of the decoded first image according to display settings such as a screen brightness setting, a blue light blocking filter, etc. That is, an image quality degradation may occur due to changes in brightness and color.

The terminal 150 may capture the first image 170 by using an image capturer 175 to obtain a captured image. In this case, the captured image may be an image in which the display settings and the like are considered. The terminal 150 may encode the captured image by using a first encoder 180. The encoded captured image may be stored in the terminal 150, but is not limited thereto, and the captured image, which is not encoded, may be stored in the terminal 150.

In the case where the encoded captured image is stored, the terminal 150, when uploading an image to the server 100, may transmit, to the server 100, image data 190 including the encoded captured image, or may decode the encoded captured image, then re-encode the decoded result through the first encoder 180 based on encoding parameters set by the SNS or an instant messenger application, and transmit, to the server 100, the image data 190 including the re-encoded captured image. In the case where the captured image, which is not encoded, is stored, the terminal 150 may encode the captured image through the first encoder 180 to obtain an encoded captured image, and transmit, to the server 100, the image data 190 including the encoded captured image.

An image quality degradation due to an encoding error may occur due to re-encoding, and in addition, an image quality degradation due to changes in brightness and color in the capture process may accumulate. The image data 125 received through the receiver 155 or the first image decoded through the first decoder 160 may be stored without using the image capturer 175, and in this case, the image quality degradation due to the changes in brightness and color in the capture process may not occur.

The server 100 may receive the image data 190 through a receiver 130 and store image data 190 as the original image. However, the disclosure is not limited thereto, and the server 100 may store, as the original image, an image obtained by decoding through the first decoder 140.

In the case where the original image 105 is an encoded image, the server 100, upon a download request by the terminal 150 with respect to the image, may directly transmit the original image 105 to the terminal 150 through the transmitter 120, or may decode the original image 105 through the first decoder 140, then re-encode the decoded original image through the first encoder 110, and transmit the re-encoded original image to the terminal 150 through the transmitter 120. In embodiments, in the case where the original image 105 is a decoded image, the server 100 may encode the original image 105 and transmit the encoded original image to the terminal 150 through the transmitter 120. In this case, in encoding through the first encoder 110, an image quality degradation may occur due to an encoding error, and thus image quality degradations may accumulate in the image data 125.

As described above, when repeatedly performing downloading/uploading and capturing/storing of an image between the server 100 and the terminal 150, various types of image quality degradations may accumulate.

Therefore, there is a need for a method of effectively reducing various types of image quality degradations that occur and accumulate in image transmission between the server 100 and the terminal 150 through an SNS and the Internet.

Figure 2:
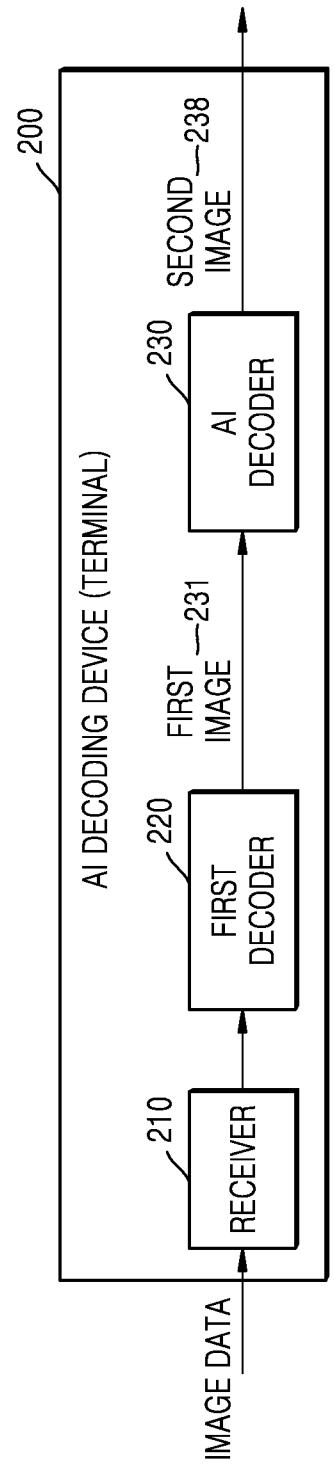
FIG. 2 is a block diagram illustrating a configuration of an artificial intelligence (AI) decoding device according to an embodiment.

FIG. 2 is a block diagram illustrating a configuration of a terminal 200, according to an embodiment of the disclosure. In embodiments, the terminal 200 may be, or may include, an AI decoding device.

Referring to FIG. 2, the terminal 200 according to an embodiment of the disclosure includes a receiver 210, a first decoder 220, and an AI decoder 230. The AI decoder 230 may include an image feature information obtainer 232, an image quality degradation type identifier 234, a DNN setting information obtainer 235, and an image quality degradation processor 236. A detailed description of the configuration of an example of the AI decoder 230 will be described below with reference to FIG. 3.

Although the receiver 210, the first decoder 220, and the AI decoder 230 are illustrated as separate devices in FIG. 2, the receiver 210, the first decoder 220, and the AI decoder 230 may be implemented as one processor. In this case, the receiver 210, the first decoder 220, and the AI decoder 230 may be implemented as a dedicated processor or a combination of software and a general-purpose processor such as an application processor (AP), a central processing unit (CPU) or a graphics processing unit (GPU). In addition, the dedicated processor may include a memory for implementing embodiments of the disclosure or a memory processing unit for using an external memory.

The receiver 210, the first decoder 220, and the AI decoder 230 may be implemented as a plurality of processors. In this case, the receiver 210, the first decoder 220, and the AI decoder 230 may be implemented as a combination of dedicated processors or a combination of software and general-purpose processors such as APs, CPUs or GPUs. In an embodiment of the disclosure, the receiver 210 may be implemented as a first processor, the first decoder 220 may be implemented as a second processor different from the first processor, and the AI decoder 230 may be implemented as a third processor different from different from the first processor and the second processor.

The receiver 210 receives image data obtained as a result of first encoding. For example, the image data may be a video file having a file format such as MP4 or MOV or an image file having a file format such as JPG, JPEG, or JFIF, or any type of image data having any image format as desired. The receiver 210 may receive image data transmitted through a network. The receiver 210 outputs the image data to the first decoder 220.

In an embodiment of the disclosure, the image data may be obtained from a data storage medium including a magnetic medium such as a hard disk, a floppy disk, or a magnetic tape, an optical recording medium such as a compact disc read-only memory (CD-ROM) or a digital versatile disc (DVD), or a magneto-optical medium such as a floptical disk.

The first decoder 220 reconstructs a first image 231 based on the image data received from the receiver 210. The first image 231 obtained by the first decoder 220 is provided to the AI decoder 230.

The AI decoder 230 may obtain image feature information of the first image 231 related to an image quality degradation, identify an image quality degradation type based on the image feature information, and process the image quality degradation corresponding to the identified image quality degradation type by using a neural network (i.e., the first DNN) to obtain a second image 238 with reduced image quality. An example of a detailed operation of the AI decoder 230 will be described below with reference to FIG. 3.

Figure 3:
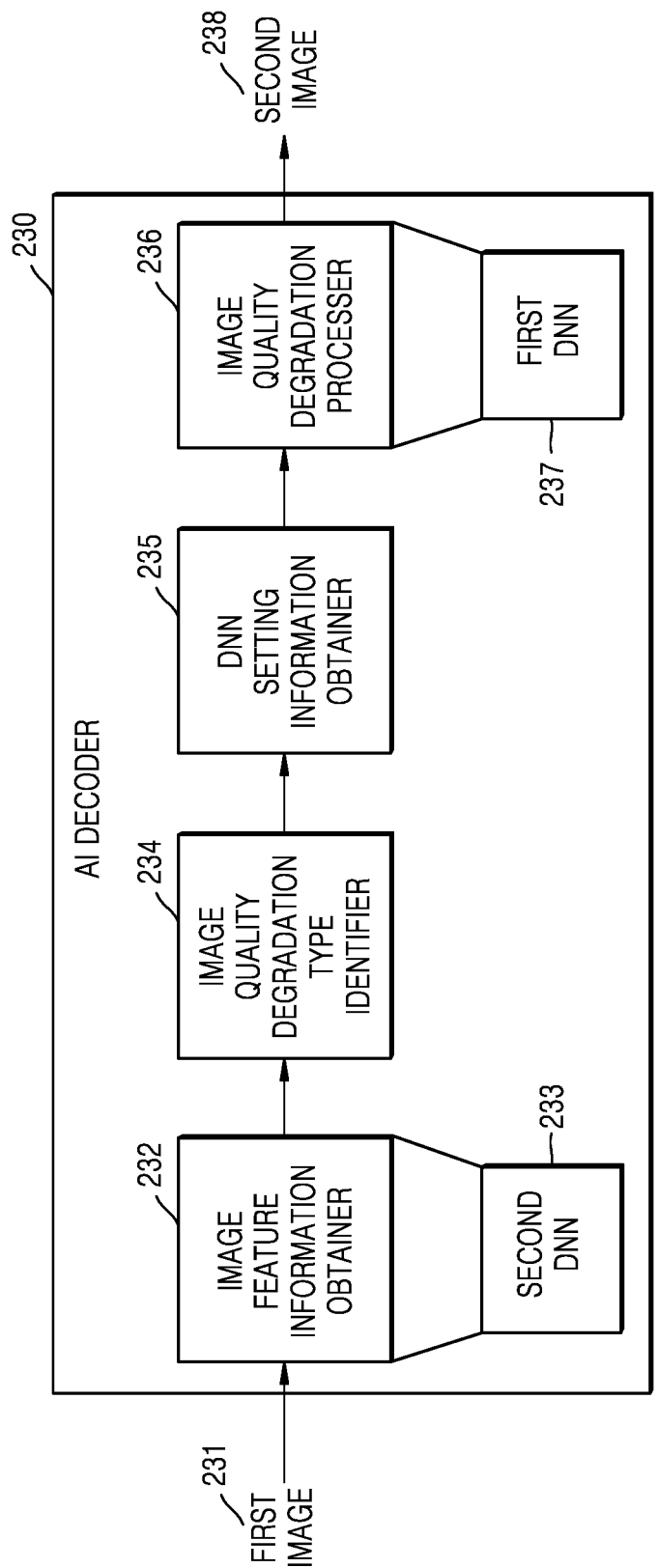
FIG. 3 is a block diagram illustrating a configuration of an AI decoder according to an embodiment.

FIG. 3 is a block diagram illustrating a configuration of the AI decoder 230 according to an embodiment of the disclosure.

As illustrated in FIG. 3, the AI decoder 230 may include the image feature information obtainer 232, the image quality degradation type identifier 234, the DNN setting information obtainer 235, and the image quality degradation processor 236. In this case, the image quality degradation processor 236 may use a first DNN 237 which is pre-trained corresponding to a preset image quality degradation type. In this case, the preset image quality degradation type may include at least one of resolution-related image quality degradations, color and brightness-related image quality degradations, or encoding-related image quality degradations, but is not limited thereto, and various types of image quality degradations that occur when exchanging images between servers and terminals through an SNS and the Internet may be considered. Meanwhile, when a plurality of image quality degradations of the same type occur, the overall image quality degradation may be similar to an image quality degradation under the worst condition. For example, when an image encoded at a bit rate of 2 Mbps is subsequently encoded at a bit rate of 3 Mbps, the overall image quality degradation may be similar to an image quality degradation with a bit rate of 2 Mbps. This is because, once an encoding-related image quality degradation occurs with a bit rate of 2 Mbps, the portion of the encoding-related image quality degradation cannot be reconstructed even by encoding at a higher bit rate of 3 Mbps.

The image feature information obtainer 232 may obtain, based on the first image 231, the image feature information of the first image 231 related to an image quality degradation. In this case, the image feature information obtainer 232 may obtain the image feature information of the first image 231 related to the image quality degradation by inputting the first image 231 to at least one second DNN 233. In this case, the second DNN 233 may be a neural network for identifying a preset image quality degradation type. The second DNN 233 may have been pre-trained. An example of a process of training the second DNN 233 will be described below with reference to FIGS. 4B and 5. Meanwhile, the method of obtaining the image feature information of the first image 231 is not limited to using the second DNN 233, and the image feature information of the first image 231 related to the image quality degradation may be obtained based on at least one of a color histogram of the first image 231, edges and blocking artifacts detected in the first image 231, or the bit rate and resolution of the first image 231.

The image quality degradation type identifier 234 may identify one image quality degradation type among a plurality of image quality degradation types based on the image feature information of the first image 231. For example, the image quality degradation type identifier 234 may obtain a value indicating a degree of a preset image quality degradation type of the first image 231 based on the image feature information of the first image 231. When the value indicating the degree of the preset image quality degradation type is greater than or equal to a first threshold, the image quality degradation type identifier 234 may determine that image processing corresponding to the preset image quality degradation type should be performed by using the first DNN 237 When the value indicating the degree of the preset image quality degradation type is less than the first threshold, the image quality degradation type identifier 234 may determine image processing corresponding to the preset image quality degradation type should not be performed by using the first DNN 237

The image quality degradation type identifier 234 may obtain values indicating degrees of a plurality of image quality degradation types of the first image 231 based on the image feature information of the first image 231. The image quality degradation type identifier 234 may identify one image quality degradation type having the highest value among the values indicating the degrees of the plurality of image quality degradation types.

The DNN setting information obtainer 235 may obtain neural network (NN) setting information of the first DNN 237 corresponding to the image quality degradation type identified by the image quality degradation type identifier 234, among NN setting information of the plurality of first DNNs which are pre-stored and correspond to a plurality of image quality degradation types, respectively.

The image quality degradation processor 236 may use the first DNN 237 corresponding to the NN setting information of the first DNN 237 obtained through the DNN setting information obtainer 235, to obtain the second image 238 in which the image quality degradation is reduced. In this case, the first DNN 237 may be a neural network for reducing the image quality degradation of the preset image quality degradation type. The first DNN 237 may have been pre-trained. An example of a process of training the first DNN 237 will be described below with reference to FIGS. 4B and 5.

Meanwhile, the first image 231 may include a plurality of image quality degradation types, each image quality degradation type may be repeatedly processed sequentially through the image feature information obtainer 232, the image quality degradation type identifier 234, the DNN setting information obtainer 235, and the image quality degradation processor 236. Then, when a value indicating a degree of a preset image quality degradation type of an input image (e.g., the first image) is less than the first threshold, further processing of image quality degradations may be stopped.

Meanwhile, the image quality degradation type identifier 234 and the DNN setting information obtainer 235 may not exist in the terminal 200 but may exist in a server. Because there may be a limitation on setting information of the first DNN 237 that may be pre-stored in the terminal 200, the server may store the setting information of the plurality of first DNNs which are pre-trained corresponding to the plurality of image quality degradation types, the terminal 200 may transmit image feature information to the server, accordingly, the server may identify the image quality degradation type based on the image feature information, obtain the setting information of one first DNN 237 corresponding to the image quality degradation type, and transmit the obtained setting information to the terminal 200, and the terminal 200 may process an image quality degradation of the first image 231 by using the first DNN 237 corresponding to the received setting information of the first DNN 237. In the case where the server identifies that image processing using the first DNN 237 is not required, the server may transmit, to the terminal 200, flag information indicating that the image processing using the first DNN 237 is to be bypassed, and then the terminal 200 may bypass the image processing using the first DNN 237 based on the flag information.

Figure 4A:
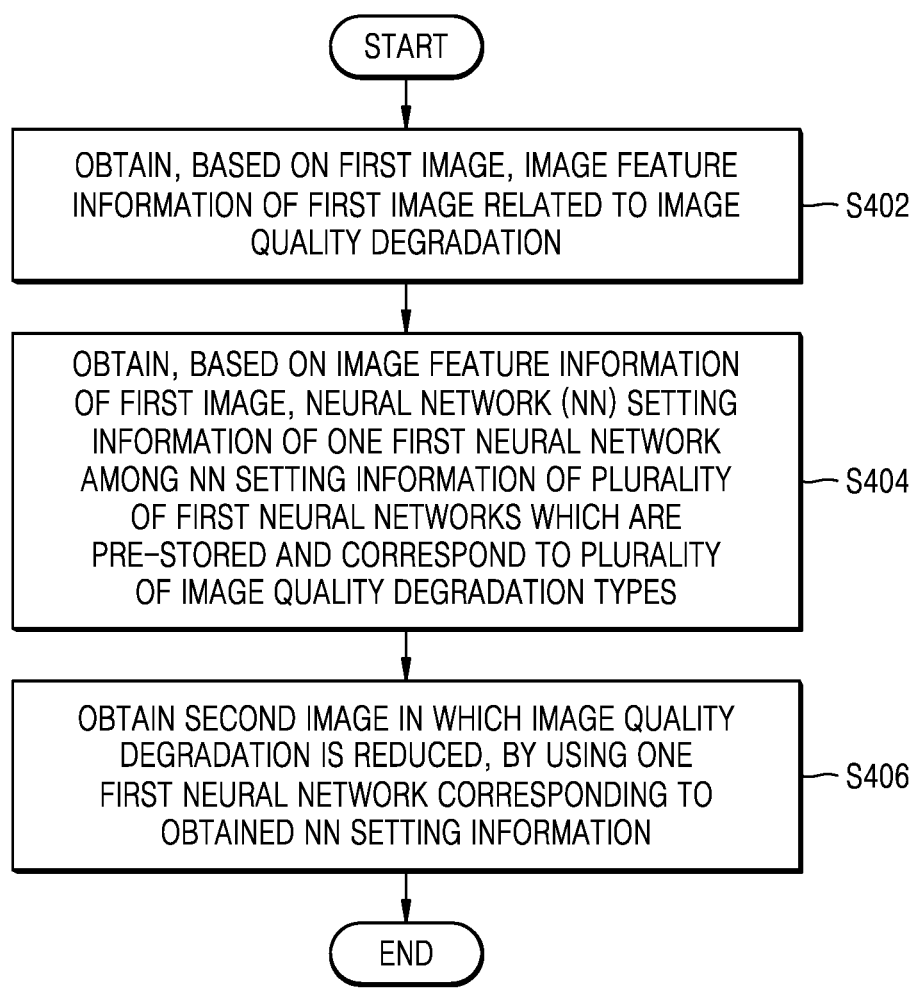
FIG. 4A is a flowchart illustrating an AI decoding method performed by an AI decoding device, according to an embodiment.

FIG. 4A is a flowchart illustrating an AI decoding method performed by the terminal 200, according to an embodiment of the disclosure.

Referring to FIG. 4A, in operation S402, the terminal 200 may obtain, based on the first image 231, image feature information of the first image 231 related to an image quality degradation. In this case, the terminal 200 may obtain the image feature information related to the image quality degradation by using a second neural network, but is not limited thereto, and may obtain the image feature information of the first image 231 related to the image quality degradation based on at least one of a color histogram of the first image 231, edges and blocking artifacts detected in the first image 231, or the bit rate and resolution of the first image 231.

In operation S404, the terminal 200 may obtain or select, based on the image feature information of the first image 231, NN setting information of one first neural network among NN setting information of a plurality of first neural networks which are pre-stored and correspond to a plurality of image quality degradation types.

In operation S406, the terminal 200 may obtain, based on the first image 231, the second image 238 in which the image quality degradation is reduced, by using the first neural network corresponding to the obtained NN setting information.

Figure 4B:
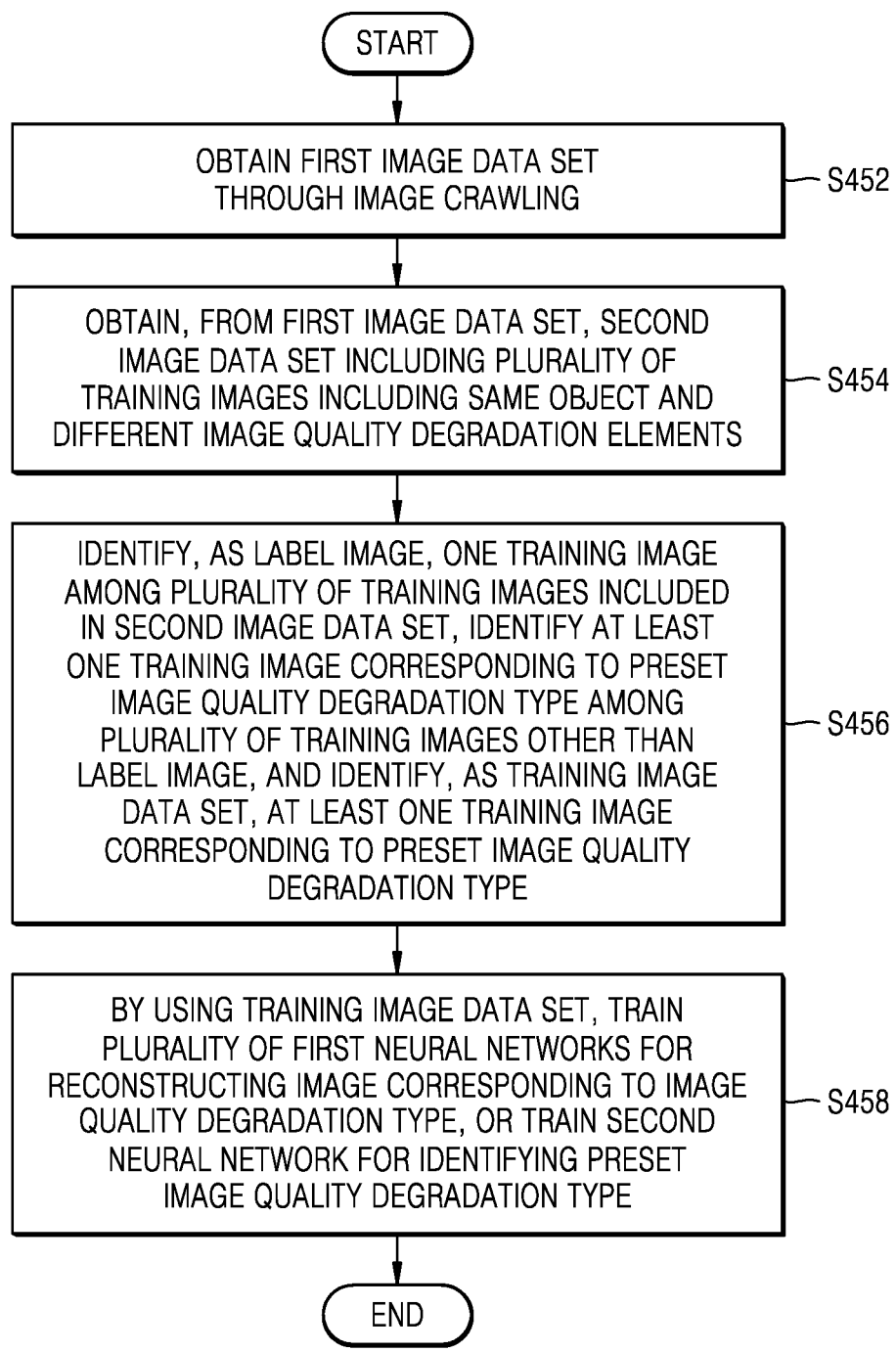
FIG. 4B is a flowchart illustrating a method of training a first deep neural network (DNN) or a second DNN, according to an embodiment.

FIG. 4B is a flowchart illustrating a method of training a first DNN or a second DNN, according to an embodiment of the disclosure.

Referring to FIG. 4B, in operation S452, a training device may obtain a first image data set through image crawling. In this case, the training device may be the server or the terminal 200, but is not limited thereto, and may be a separate device.

In operation S454, the training device may obtain, from the first image data set, a second image data set including a plurality of training images including the same object and different image quality degradation elements. Here, the training device may identify feature points of images included in the first image data set, and identify, based on the identified feature points, the plurality of training images including the same object and different image quality degradation elements. Here, techniques such as scale-invariant feature transform (SIFT) and speeded up robust features (SURF) may be used for finding the feature point.

In operation S456, the training device may identify, as a label image, one training image among the plurality of training images included in the second image data set.

The training device may identify at least one training image corresponding to a preset image quality degradation type among the plurality of training images other than the label image. Here, the label image may be an image among the plurality of training images, which is considered to be an original image because of its less degraded image quality.

In operation S458, by using the training image data set, the training device may train the plurality of first neural networks (e.g., the first DNNs) for reconstructing an image corresponding to an image quality degradation type, or train a second neural network (e.g., the second DNN) for identifying a preset image quality degradation type. Here, the training device may update parameters of the first neural network or the second neural network to reduce a loss between the label image and an output of the first neural network or the second neural network with respect to at least one training image corresponding to the preset image quality degradation type.

Meanwhile, the first neural network and the second neural network may be trained separately, but are not limited thereto, and may be jointly trained.

Figure 5:
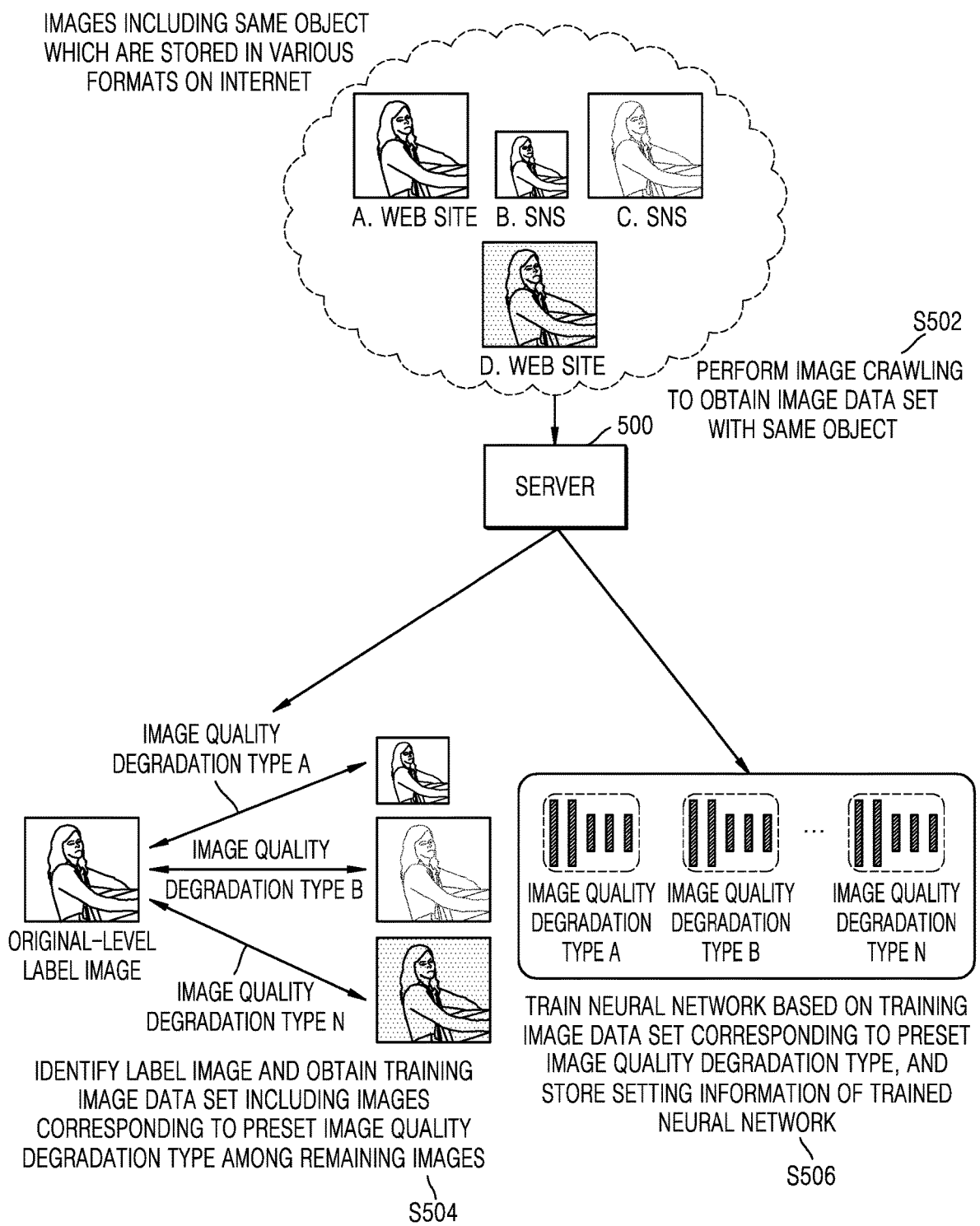
FIG. 5 is a diagram illustrating a process of training a first or second DNN of a server and storing setting information of the trained first or second DNN, according to an embodiment.

FIG. 5 is a diagram illustrating a process of training a first or second DNN of a server 500 and storing setting information of the trained first or second DNN, according to an embodiment of the disclosure.

Referring to FIG. 5, in operation S502, the server 500 may obtain, through image crawling, an image data set with the same object stored in various formats on the Internet/SNSs.

In operation S504, the server 500 may identify an original-level label image among images included in the image data set with the same object. The server 500 may obtain, among the images other than the original-level label image, a training image data set including images corresponding to a preset image quality degradation type (e.g., image quality degradation type A, B, N). That is, the server 500 may obtain training image data sets each corresponding to each preset image quality degradation type (e.g., image quality degradation type A, B, N) according to various image quality degradation types.

In operation S506, the server 500 may train the neural network based on the training image data set corresponding to a preset image quality degradation type, and store setting information of the neural network. In this case, the first neural network and the second neural network may be separately or jointly trained, and setting information of the second neural network may be transmitted to and stored in the terminal 200.

Figure 6:
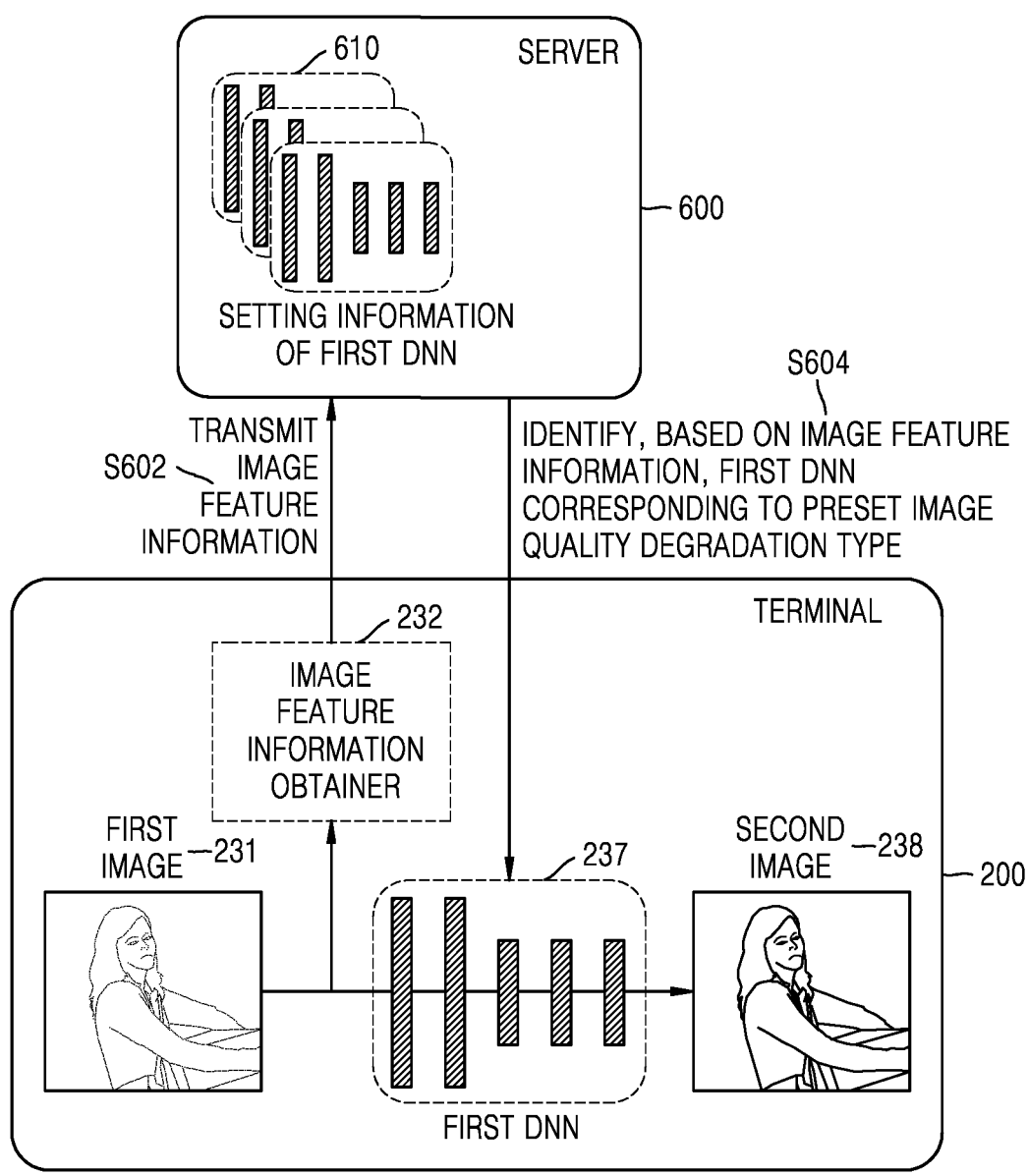
FIG. 6 is a diagram illustrating a process, performed by a terminal, of performing image processing using a first DNN by using setting information of a first DNN which corresponds to a preset image quality degradation type and is pre-stored in a server, according to an embodiment.

FIG. 6 is a diagram illustrating a process, performed by the terminal 200, of performing image processing using the first DNN 237 by using setting information of a first DNN which corresponds to a preset image quality degradation type and is pre-stored in a server 600, according to an embodiment of the disclosure.

Referring to FIG. 6, in operation S602, the terminal 200 may obtain the image feature information of the first image 231 through the image feature information obtainer 232, and transmit the image feature information to the server 600.

In operation S604, the server 600 may identify, based on the image feature information of the first image 231, the first DNN 237 corresponding to the preset image quality degradation type among the plurality of first DNNs, obtain pre-stored setting information 610 of the first DNN 237, and transmit the setting information 610 of the first DNN to the terminal 200.

The terminal 200 may set the first DNN 237 based on the setting information 610 of the first DNN, and input the first image 231 to the first DNN 237 to output the second image 238. That is, the terminal 200 may use the first DNN 237 corresponding to a preset image quality degradation type to obtain, from the first image 231, the second image 238 in which a preset image quality degradation is reduced.

Figure 7:
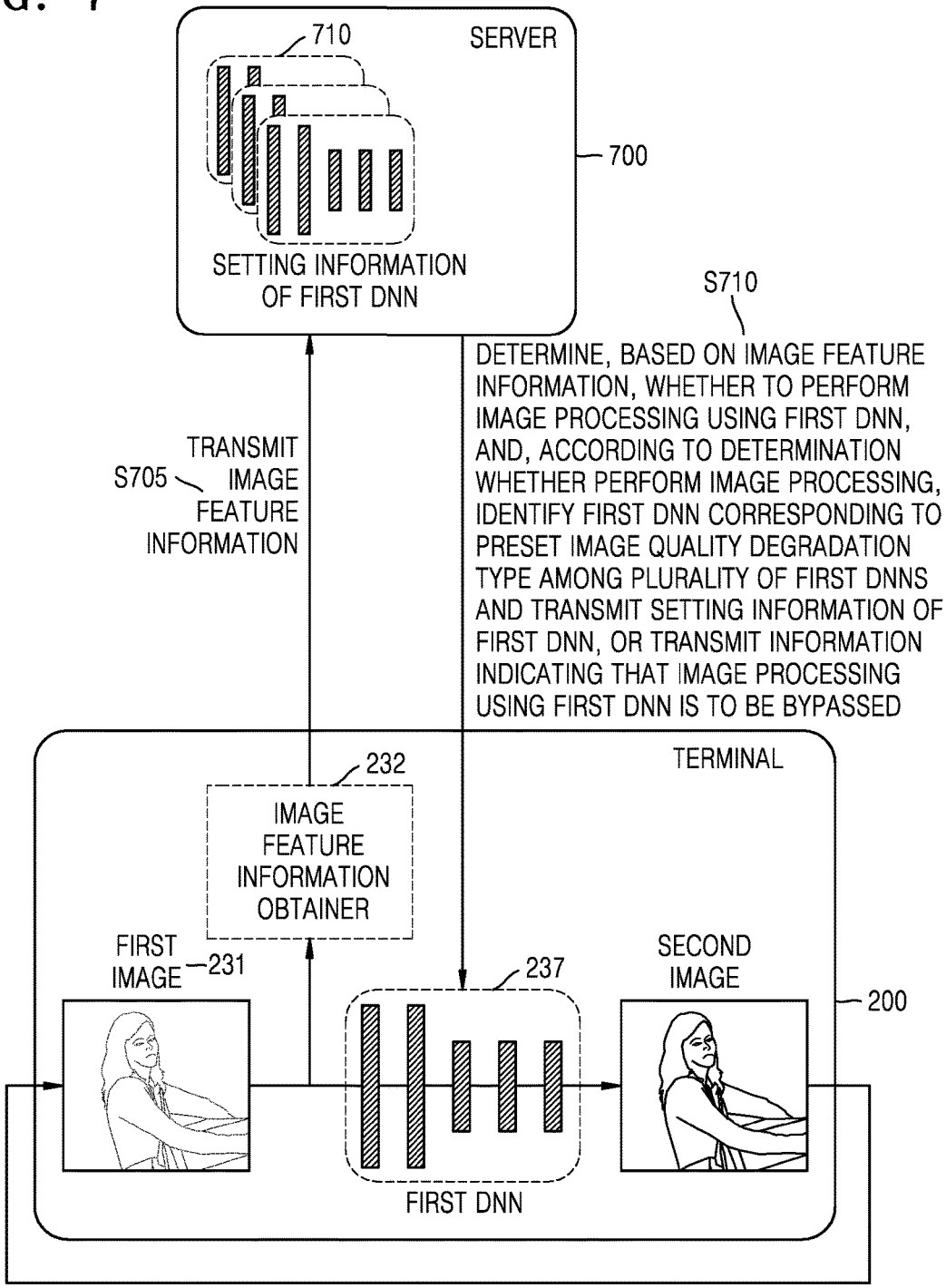
FIG. 7 is a diagram illustrating a process, performed by a terminal, of repeatedly performing image processing using a first DNN by using setting information of a first DNN which corresponds to a preset image quality degradation type and is pre-stored in a server, or bypassing the image processing, according to an embodiment.

FIG. 7 is a diagram illustrating a process, performed by the terminal 200, of repeatedly performing image processing using the first DNN 237 by using setting information 710 of a first DNN which corresponds to a preset image quality degradation type and is pre-stored in a server 700, or bypassing the image processing, according to an embodiment of the disclosure.

Referring to FIG. 7, in operation S705, the terminal 200 may obtain the image feature information of the first image 231 through the image feature information obtainer 232, and transmit the image feature information to the server 700.

In operation S710, the terminal 200 may identify or determine, based on the image feature information of the first image 231, whether to perform the image processing using the first DNN 237. For example, the terminal 200 may obtain, based on the image feature information of the first image 231, a value indicating a degree of a preset image quality degradation type, and, when the value indicating the degree of the preset image quality degradation type is greater than or equal to a preset threshold, determine to perform the image processing using the first DNN 237 to reduce the preset image quality degradation. The terminal 200 may determine not to perform the image processing using the first DNN 237 to reduce the preset image quality degradation, when the value indicating the degree of the preset image quality degradation type is less than the preset threshold. The terminal 200 may obtain, based on the image feature information of the first image 231, values indicating degrees of a plurality of image quality degradation types, identify the image quality degradation type having the highest value among them, determine whether the value indicating the degree of the corresponding image quality degradation type is greater than, equal to, or less than the preset threshold, and thus determine whether to perform the image processing using the first DNN 237 to reduce the preset image quality degradation.

The server 700 may identify, among the plurality of first DNNs, the first DNN 237 corresponding to the preset image quality degradation type, and obtain, among pre-stored setting information of the plurality of first DNNs, setting information 710 of the first DNN corresponding to the preset image quality degradation type and transmit the setting information 710 to the terminal 200, or transmit, to the terminal 200, information indicating that the image processing using the first DNN is to be bypassed. In embodiments, the information indicating that the image processing using the first DNN is to be bypassed may be flag information, however, the information is not limited thereto, and may be various types of information.

The terminal 200 may bypass the image processing using the first DNN 237 with respect to the first image 231 based on the information indicating that the image processing using the first DNN 237 is to be bypassed.

In embodiments, when the terminal 200 receives, from the server 700, the setting information 710 of the first DNN corresponding to the preset image quality degradation type among the pre-stored setting information of the plurality of first DNNs, the terminal 200 may set the first DNN 237 based on the setting information of the first DNN, and input the first image 231 to the first DNN 237 to output the second image 238. That is, the terminal 200 may use the first DNN 237 corresponding to the preset image quality degradation type to obtain, based on the first image 231, the second image 238 in which the preset image quality degradation is reduced.

In operation S715, the terminal 200 may substitute the first image 231 with the second image 238 to obtain a new first image 231, obtain image feature information of the new first image 231, and identify, based on the image feature information, whether to perform image processing using the first DNN 237. The terminal 200 may repeatedly perform the image processing using the first DNN 237 or bypass the image processing, according to the determination of whether to perform the image processing using the first DNN 237. That is, the terminal 200 may identify the most dominant image quality degradation type in the first image 231, and then repeatedly determine whether to perform the image processing using the first DNN 237 corresponding to the image quality degradation type, to gradually reduce a plurality of image quality degradations. Finally, when a value indicating a degree of the most dominant image quality degradation type is less than the preset threshold, the image processing using the first DNN 237 may be no longer performed and bypassed, and thus the second image 238 in which the image quality degradations are finally reduced may be obtained.

Figure 8:
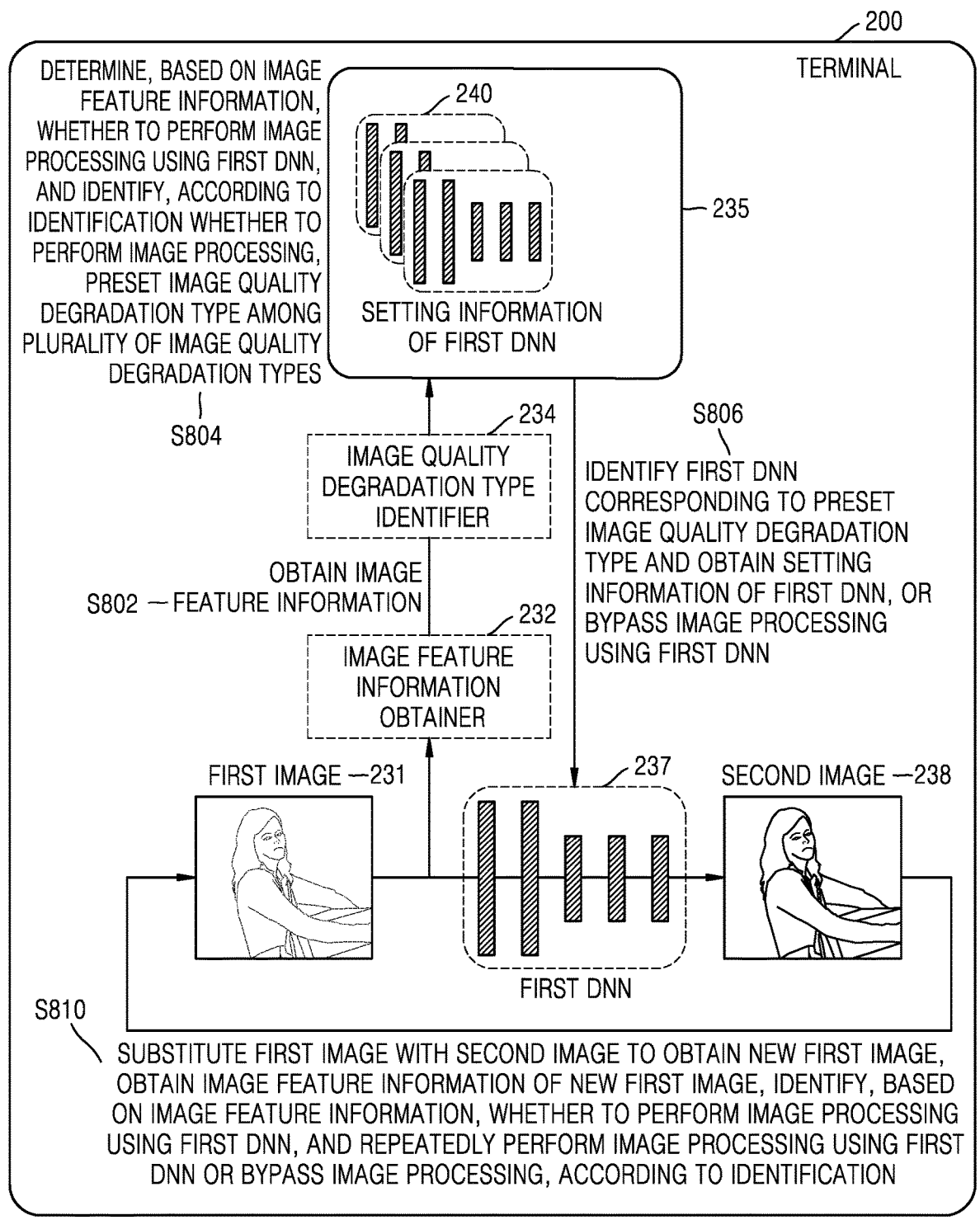
FIG. 8 is a diagram illustrating a process of repeatedly performing image processing using a first DNN by using setting information of a first DNN which corresponds to a preset image quality degradation type and is pre-stored in a terminal, or bypassing the image processing, according to an embodiment.

FIG. 8 is a process of repeatedly performing image processing using the first DNN 237 by using setting information 240 of a first DNN which corresponds to a preset image quality degradation type and is pre-stored in the terminal 200, or bypassing the image processing, according to an embodiment of the disclosure.

Referring to FIG. 8, in operation S802, the terminal 200 may obtain the image feature information of the first image 231 through the image feature information obtainer 232.

In operation S804, the terminal 200 may determine, based on the image feature information and through the image quality degradation type identifier 234, whether to perform the image processing using the first DNN 237, and identify, according to the determination whether to perform the image processing, a preset image quality degradation type among a plurality of image quality degradation types.

In operation S806, based on a determination to perform the image processing using the first DNN 237, the terminal 200 may identify the first DNN 237 corresponding to the preset image quality degradation type through the DNN setting information obtainer 235, and obtain the setting information 240 of the first DNN corresponding to the preset image quality degradation type among the plurality of first DNNs which are pre-stored and correspond to the plurality of image quality degradation types, or bypass the image processing using the first DNN 237.

When the terminal 200 obtains the setting information 240 of the first DNN corresponding to the preset image quality degradation type, the terminal 200 may set the first DNN 237 based on the setting information 240 of the first DNN, and input the first image 231 to the first DNN 237 to output the second image 238. That is, the terminal 200 may use the first DNN 237 corresponding to the preset image quality degradation type to obtain, based on the first image 231, the second image 238 in which the preset image quality degradation is reduced.

In operation S810, the terminal 200 may substitute the first image 231 with the second image 238 to obtain a new first image 231, obtain image feature information of the new first image 231, and determine, based on the image feature information, whether to perform additional image processing using the first DNN 237. The terminal 200 may repeatedly perform the image processing using the first DNN 237 or bypass the image processing, according to the determination whether to perform the image processing using the first DNN 237. That is, the terminal 200 may identify the most dominant image quality degradation type in the first image 231, and repeatedly determine whether to perform the image processing using the first DNN 237 corresponding to the image quality degradation type and perform the image processing, to gradually reduce a plurality of image quality degradations. Finally, when a value indicating a degree of the most dominant image quality degradation type is less than the preset threshold, the image processing using the first DNN 237 may be no longer performed and bypassed, and thus the second image 238 in which the image quality degradations are finally reduced.

In the embodiment described above with reference to FIG. 7, when it is difficult for the terminal 200 to store setting information of a plurality of first DNNs corresponding to various image quality degradation types, the server 700 may store the setting information of the plurality of first DNNs corresponding to various image quality degradation types, the terminal 200 may transmit, to the server 700, a request related to image processing using the first DNN 237, based on the image feature information of the first image 231, and the server 700 may determine whether to perform the image processing using the first DNN 237, transmit, the terminal 200, information about whether to perform the image processing, obtain setting information of the first DNN 237 corresponding to a preset image quality degradation type, and transmit the setting information to the terminal 200 according to the determination whether to perform the image processing, so as to allow the terminal 200 to perform the image processing using the first DNN 237 corresponding to the preset image quality degradation type. However, in the embodiment described above with reference to FIG. 8, the terminal 200 may identify, directly without intervention of the server 700, whether to perform the image processing using the first DNN 237, obtain the setting information of the first DNN corresponding to the preset image quality degradation type pre-stored in the terminal 200 according to the determination whether to perform the image processing, and perform the image processing using the first DNN 237 corresponding to the preset image quality degradation type.

That is, according to the embodiment of FIG. 7, the server 700 may share tasks of the image quality degradation type identifier 234 and the DNN setting information obtainer 235 of the terminal 200 to perform the tasks, as a proxy for the terminal 200.

According to various embodiments of the disclosure, in the case where various types of degradations in image quality occur in repeating downloading/uploading and capturing/storing of the same image between a server and a terminal through an SNS and the Internet, the degradations in image quality of the image may be effectively reduced by using a neural network pre-trained by using a training image data set, to process the degradations in image quality. In particular, a plurality of types of image quality degradations may be effectively reduced by gradually processing the image quality degradations, such that the most dominant image quality degradation type is identified and the image quality degradations of the type are processed first, and then the next dominant image quality degradation type is identified and the image quality degradations of the type are processed.

Meanwhile, the embodiments of the disclosure described above may be written as computer-executable programs or instructions, and the written programs or instructions may be stored in a medium.

The medium may permanently store the computer-executable programs or instructions, or store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, random-access memory (RAM), and a flash memory, which are configured to store program instructions. Other examples of the medium include recording media and storage media managed by application stores distributing applications or by websites, servers, and the like supplying or distributing other various types of software.

Meanwhile, a model related to the DNN described above may be implemented as software. When the DNN model is implemented as software (e.g., a program module including instructions), the DNN model may be stored in a computer-readable recording medium.

Also, the DNN model may be part of the terminal 200 described above by being integrated in a form of a hardware chip. For example, the DNN model may be manufactured in a form of a dedicated hardware chip for AI, or may be manufactured as part of an existing general-purpose processor (e.g., a CPU or an application processor) or a graphic-dedicated processor (e.g., a GPU).

Also, the DNN model may be provided in a form of downloadable software. A computer program product may include a product (e.g., a downloadable application) in a form of a software program electronically distributed through a manufacturer or an electronic market. For electronic distribution, at least part of the software program may be stored in a storage medium or may be temporarily generated. In this case, the storage medium may be a server of the manufacturer or electronic market, or a storage medium of a relay server.

Although the scope of the disclosure has been described with reference to preferred embodiments, the scope of the disclosure is not limited to the embodiments, and various modifications and changes may be made by those of ordinary skill in the art without departing from the scope of the disclosure.

The invention claimed is:

1. A method, performed by a terminal, of performing artificial intelligence (AI) decoding, the method comprising:
   obtaining, based on a first image, image feature information of the first image, the image feature information being related to an image quality degradation;
   obtaining, based on the image feature information of the first image, neural network (NN) setting information of a first NN corresponding to an image quality degradation type of the first image, from among NN setting information of a plurality of first NNs which are pre-stored, wherein each first NN from among the plurality of first NNs corresponds to an image quality degradation type from among a plurality of image quality degradation types; and
   obtaining, by using the first NN, a second image in which the image quality degradation is reduced.

2. The method of claim 1, wherein the image feature information is obtained by inputting the first image to a second NN.

3. The method of claim 2, wherein a first image data set is obtained through image crawling,
   wherein a second image data set comprising a plurality of training images, which include a same object and have different image quality degradation elements, is obtained from the first image data set,
   wherein one training image of the plurality of training images included in the second image data set is identified as a label image, at least one training image corresponding to a preset image quality degradation type is identified among the plurality of training images other than the label image,
   wherein the label image and the at least one training image corresponding to the preset image quality degradation type are identified as a training image data set, and
   wherein the second NN for identifying the preset image quality degradation type is trained by using the training image data set.

4. The method of claim 2, wherein the image quality degradation comprises at least one of resolution-related image quality degradations, color-related image quality degradations, brightness-related image quality degradations, or encoding-related image quality degradations.

5. The method of claim 1, wherein the obtaining of the NN setting information of the first NN comprises:
transmitting the image feature information of the first image to a server; and
receiving, from the server, based on the image feature information of the first image, the NN setting information of the first NN from among the NN setting information of the plurality of first NNs which are pre-stored in the server.

6. The method of claim 1, wherein a first image data set is obtained through image crawling,
wherein a second image data set comprising a plurality of training images, which include a same object and which have different image quality degradation elements, is obtained from the first image data set,
wherein one training image of the plurality of training images included in the second image data set is identified as a label image, at least one training image corresponding to a preset image quality degradation type is identified among the plurality of training images other than the label image, and the label image and the at least one training image corresponding to the preset image quality degradation type are included in a training image data set, and
wherein one first NN from among the plurality of first NNs for processing an image corresponding to the preset image quality degradation type is trained by using the training image data set.

7. The method of claim 6, wherein, when the second image data set is obtained from the first image data set,
wherein feature points of images included in the first image data set are identified, and
wherein the plurality of training images are identified based on the identified feature points.

8. The method of claim 1, wherein the obtaining of the NN setting information of the first NN comprises:
obtaining, based on the image feature information of the first image, a value indicating a degree of a preset image quality degradation type present in the first image;
based on the value being greater than a first threshold, determining to perform image processing corresponding to the preset image quality degradation type by using the first NN; and
based on the value indicating the degree of the preset image quality degradation type being less than the first threshold, determining not to perform the image processing corresponding to the preset image quality degradation type by using the first NN.

9. The method of claim 1, wherein the obtaining of the image feature information of the first image, the obtaining of the NN setting information of the first NN, and the obtaining of the second image in which the image quality degradation is reduced are repeatedly performed with regard to the plurality of image quality degradation types.

10. The method of claim 1, wherein the obtaining of the NN setting information of the first NN comprises:
transmitting the image feature information of the first image to a server;
receiving, from the server, flag information indicating whether to perform AI image processing, the flag information being determined based on the image feature information of the first image; and
obtaining the NN setting information of the first NN based on the flag information.

11. The method of claim 1, wherein the obtaining of the NN setting information of the first NN comprises:
obtaining, based on the image feature information of the first image, values indicating degrees of the plurality of image quality degradation types of the first image;
identifying an image quality degradation type having a highest value among the values; and
obtaining the NN setting information of the first NN corresponding to the image quality degradation type among the NN setting information of the plurality of first NNs.

12. The method of claim 1, wherein the image feature information is obtained based on at least one of a color histogram of the first image, edges and blocking artifacts detected in the first image, a bit rate of the first image, or a resolution of the first image.

13. The method of claim 1, further comprising:
selecting, based on the image feature information of the first image, the image quality degradation type of the first image from the plurality of image quality degradation types.

14. A terminal for artificial intelligence (AI) decoding, the terminal comprising at least one processor configured to execute one or more instructions to:
obtain, based on a first image, image feature information of the first image, the image feature information being related to an image quality degradation,
obtain, based on the image feature information of the first image, neural network (NN) setting information of a first NN corresponding to an image quality degradation type of the first image, from among NN setting information of a plurality of first NNs which are pre-stored, wherein each first NN from among the plurality of first NNs corresponds to an image quality degradation type from among a plurality of image quality degradation types, and
obtain, by using the first NN, which is set based on the NN setting information of the first NN, a second image in which the image quality degradation is reduced.

15. The terminal of claim 14, wherein the image feature information is obtained by inputting the first image to a second neural network.

16. A non-transitory computer-readable recording medium having recorded thereon instructions which, when executed by at least one processor, cause the at least one processor to:
obtain, based on a first image, image feature information of the first image, the image feature information being related to an image quality degradation;
obtain, based on the image feature information of the first image, neural network (NN) setting information of a first NN corresponding to an image quality degradation type of the first image, from among NN setting information of a plurality of first NNs which are pre-stored, wherein each first NN from among the plurality of first NNs corresponds to an image quality degradation type from among a plurality of image quality degradation types; and
obtain, by using the first NN, a second image in which the image quality degradation is reduced.

* * * * *